United States Patent [19]
Gerritsen

[11] 4,233,547
[45] Nov. 11, 1980

[54] COLOR TELEVISION DISPLAY DEVICE COMPRISING A DEFLECTION COIL UNIT PROVIDED WITH A DEFLECTION COIL FOR THE VERTICAL DEFLECTION AND DEFLECTION COIL UNIT FOR SUCH A DISPLAY DEVICE

[75] Inventor: Jan Gerritsen, Eindhoven, Netherlands

[73] Assignee: U.S. Philips Corporation, New York, N.Y.

[21] Appl. No.: 51,596

[22] Filed: Jun. 25, 1979

[30] Foreign Application Priority Data

Jul. 31, 1978 [NL] Netherlands ............... 7808044

[51] Int. Cl.³ .............. H01J 29/70; H01J 29/76
[52] U.S. Cl. .................... 315/368; 315/13 C; 315/402
[58] Field of Search ............. 315/368, 13 C, 402

[56] References Cited
U.S. PATENT DOCUMENTS 3,803,444  4/1974  Gerritsen et al. ............... 315/368

*Primary Examiner*—Theodore M. Blum
*Attorney, Agent, or Firm*—Thomas A. Briody; William J. Streeter; Edward W. Goodman

[57] ABSTRACT

A color television display device comprising a deflection coil unit with a deflection coil for the vertical deflection which coil is divided into two coil halves. A balancing resistor by means of which the convergence can be corrected is in a parallel branch. A static convergence error introduced by this resistor owing to the non-zero inductance of the deflection coil is corrected by means for decreasing the voltage present across the balancing resistor during the trace period of the deflection current by a direct voltage in such a way that the voltage across the resistor is more decreased after the center instant of the trace period than before and that the correction current at and about said center instant is substantially zero. (FIG. 3).

10 Claims, 6 Drawing Figures

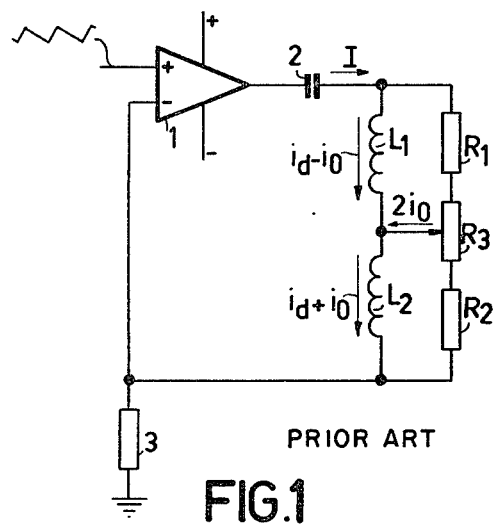
PRIOR ART
FIG.1
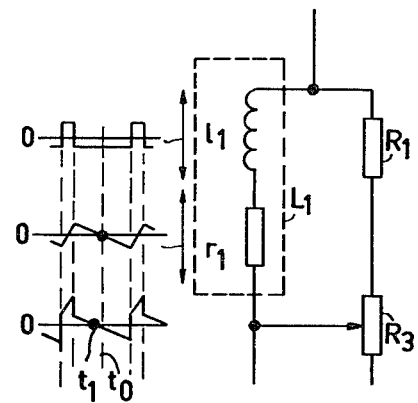
PRIOR ART
FIG.2
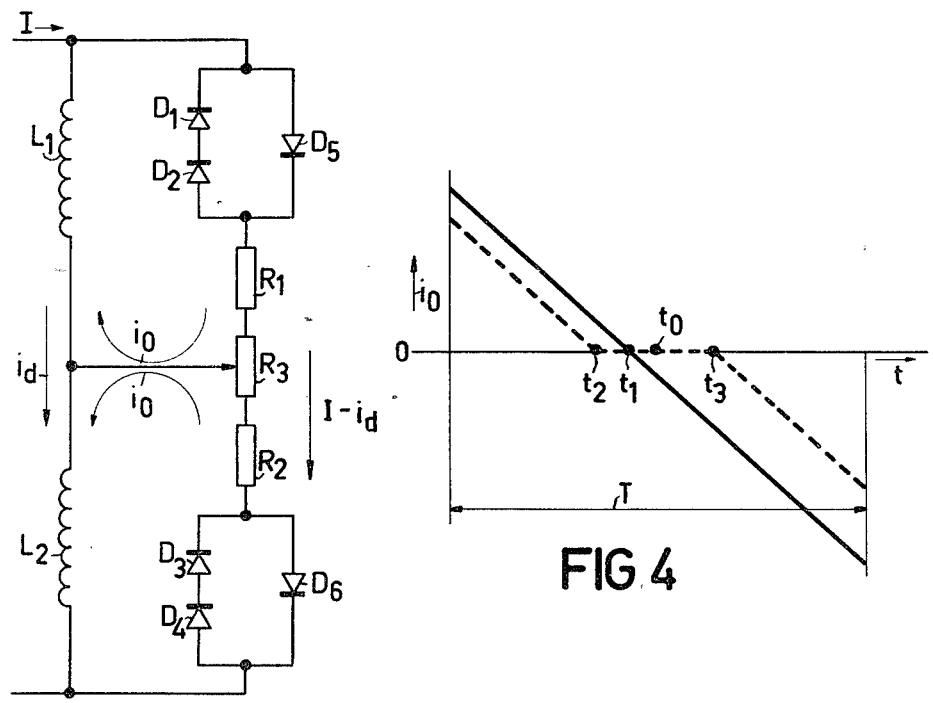
FIG.3
FIG.4

4,233,547

COLOR TELEVISION DISPLAY DEVICE COMPRISING A DEFLECTION COIL UNIT PROVIDED WITH A DEFLECTION COIL FOR THE VERTICAL DEFLECTION AND DEFLECTION COIL UNIT FOR SUCH A DISPLAY DEVICE

BACKGROUND OF THE INVENTION

The invention relates to a color television display device comprising a color picture display tube and a deflection coil unit provided with a deflection coil for deflecting into the vertical direction, the electron beams generated in the display tube, the coil being divided into two series-interconnected coil halves and being connected to a deflection current generator for generating a sawtooth deflection current flowing in operation through the deflection coil halves and having a trace and a retrace, which reverses its direction at approximately the center instant of the trace period and further provided with an adjustable balancing resistor in a parallel branch which produces a correction current which flows through the deflection coil halves.

Such a device is disclosed in U.S. Pat. No. 2,825,846. In order to eliminate asymmetry between the magnetic deflection fields generated by the coil halves, the coil halves in this known device are preferably series-connected, so that the deflection currents flowing therethrough are equal in principle, and each coil half is shunted by an adjustable resistor. By adjusting this resistor the current through the associated coil half can be adjusted individually, namely so that the resultant vertical deflection field is symmetrical with respect to the electron beams. If such a correction were not used convergence errors into the vertical direction would be the result. In the center of the display screen of the picture display tube where the deflection currents are substantially zero, there is a proper registration of colored horizontal lines. However, at the top and at the bottom of the screen, such lines would not be in registration. The asymmetry thus corrected can be caused by an irregularity in the construction of the tube, particularly in the electron gun(s) thereof, and/or in the deflection coil unit, by a deviation in the correct position of this unit, etc.

The asymmetry can also be corrected in a different manner. Namely, the correction described above may be considered as a correction by means of a so-called differential current, this being a sawtooth current which is subtracted in one coil half from the deflection current flowing therethrough, whereas in the other coil half it is added to the deflection current flowing therethrough, these two deflection currents being equal. As known, a differential current generates a so-called four-pole field which is superimposed on the deflection fields. Devices are known wherein the correction four-pole field is generated in a manner different from the manner described in the above-mentioned U.S. patent, but they are of a more intricate construction and more difficult to adjust. They require additional windings around the neck of the display tube or on the core of the deflection coil unit, which windings are passed through by currents which are generated by special generators. Consequently preference should be given to the described, simple correction method.

However, it appeared that the presence of the balancing resistors may have an adverse effect on the convergence, so that, for example, a vertical convergence error is visible in the center of the display screen while the place where no error can be observed is not located in the center but somewhat higher. This does not only indicate an error in the static convergence but also an asymmetry in the operation of the resistors between the top and the bottom of the displayed picture. The static convergence error can be compensated for by means of static correction means but this requires a laborious and time-consuming adjustment of the static convergence. Furthermore, there are color picture display tubes wherein such correction means are completely missing.

SUMMARY OF THE INVENTION

It is an object of the invention to provide simple and inexpensive means with which the known, simple correction method for correcting the asymmetry in the deflection fields can be maintained while the above-mentioned error does substantially not occur and, to this end, the device according to the invention is characterized by means for decreasing, during the trace period of the deflection current, the voltage present, in operation across the parallel branch including said balancing resistor, by a constant voltage in such a way that the voltage across said parallel branch is more decreased after said center instant than before and that the correction current at and about said center instant is substantially zero.

Preferably, the device according to the invention is characterized by two series arrangements of a substantially constant-voltage drop element which is shunted by a switch conducting before the center instant of the trace period of the deflection current, with a balancing resistor, each series arrangement being in parallel with a coil half. Herein the device according to the invention can preferably be characterized in that the substantially constant-voltage drop element is formed by the series arrangement of a plurality of diodes in the pass direction after the center instant of the trace period and in that the switch is formed by a switching diode.

The invention also relates to a deflection coil unit for a color television display device, provided with a deflection coil for the horizontal deflection, with a deflection coil for the vertical deflection which is divided into two series-interconnected coil halves and with an adjustable balancing resistor in a parallel branch, the deflection coil unit being characterized by two series arrangements of a substantially constant-voltage drop element, a switch being in parallel therewith, with a balancing resistor, each series arrangement being in parallel with a coil half.

DESCRIPTION OF THE DRAWINGS

The invention will be further explained by way of non-limitative example with reference to the accompanying figures, wherein FIG. 1 shows a known circuit for the vertial deflection, FIG. 2 illustrates the production of the convergence error to be corrected in the circuit of FIG. 1, FIG. 3 shows an embodiment of a circuit in the device according to the invention, FIG. 4 shows a current shape produced in the circuit of FIG. 1 and a current shape produced in the circuit of FIG. 3, and FIGS. 5 and 6 show further embodiments of the circuit in the device according to the invention.

DESCRIPTION OF THE PREFERRED EMBODIMENTS

Figure 5:
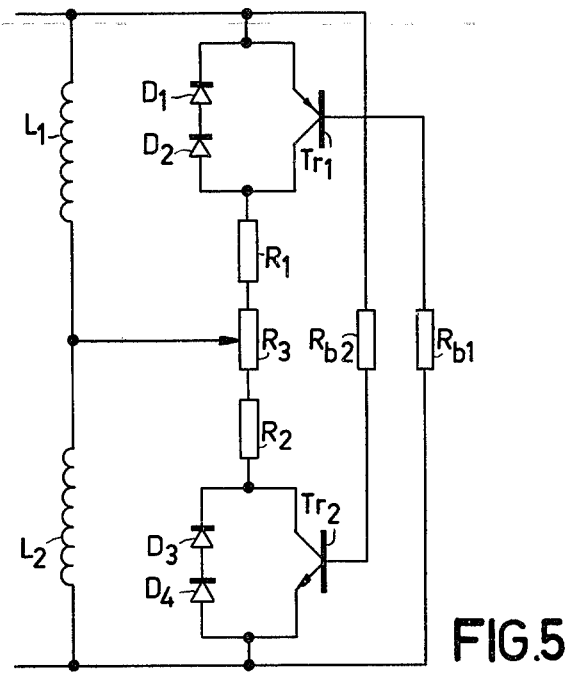

In FIG. 1 reference numeral 1 denotes a power amplifier which produces a deflection current for the vertical deflection in a color television receiver, not shown. Applied to a non-inverting input terminal thereof is a sawtooth signal coming from a sawtooth generator, not shown, and having the field frequency of 50 to 60 Hz. The series arrangement of two deflection coil halves $L_1$ and $L_2$ is connected to the output terminal of amplifier 1 through isolating capacitor 2. Coil halves $L_1$ and $L_2$ are provided around a core of magnetic material which is disposed around the neck of a color television display tube, not shown, for deflecting the electron beams generated in the tube. This core also accommodates the deflection coil for the horizontal deflection, which coil and also the other sections of the receiver will not be discussed here. The terminal of coil half $L_2$ which is not connected to coil half $L_1$ is connected to a negative feedback resistor 3 and the junction thus formed is connected to an inverting terminal of amplifier 1. Parallel with the series arrangement of coil halves $L_1$ and $L_2$ there is the series arrangement of a limiting resistor $R_1$, a trimming potentiometer $R_3$ and a limiting resistor $R_2$, the wiper of potentiometer $R_3$ being connected to the junction of coil halves $L_1$ and $L_2$. The circuit of FIG. 1 is of a known type.

During operation, a current I, originating from amplifier 1 and being of substantially the same shape as the input signal of amplifier 1 due to the action of the negative feedback, flows to the junction of coil half $L_1$ and resistor $R_1$. During the longer portion of the field cycle, the so-called trace period in which the sawtooth varies from a maximum value in one polarity to a maximum value in the other polarity, these maxima having substantially the same absolute values, the current I varies in a substantially linear manner.

An asymmetry in the magnetic deflection field generated by coil halves $L_1$ and $L_2$ does not exercise any influence at the center instant of the trace period, the current I being substantially zero at this instant. In contrast therewith the asymmetry at the beginning and at the end of the trace period produces a convergence error. Colored horizontal lines will then not be in register. A red line is, for example, displayed above a blue line at the top of the display screen, whereas the reverse occurs at the bottom of the screen. This error can be corrected for by means of the setting of potentiometer $R_3$. The currents flowing through coil halves $L_1$ and $L_2$ can be adjusted by means of this potentiometer so that the asymmetry in the fields is eliminated. A current $2i_o$ flows between the wiper of potentiometer $R_3$ and the junction of coil halves $L_1$ and $L_2$, whereas a current $i_d - i_o$ flows through coil half $L_1$ and a current $i_d + i_o$ flows through coil half $L_2$. Because of the low frequency, coil halves $L_1$ and $L_2$ behave predominantly as ohmic resistors so that said currents are subjected to a variation having substantially the same shape as that of current I. Current $i_d$ generates the vertical deflection field, whereas current $i_o$ generates the correction four-pole field. The resistance branch $R_1$, $R_3$, $R_2$ has also for its object to damp oscillations which might be produced with parasitic capacitances.

However, it has appeared that the presence of this resistive branch can affect the convergence adversely, namely to produce a vertical convergence error displayed in the center of the display screen. The place where no error can be observed is not the central horizontal line but is located above the line. The invention is based on the recognition that this error is due to the fact that the inductance of the deflection coil halves is not negligibly small. This will be explained with reference to FIG. 2, the upper half of the network formed by elements $L_1$, $L_2$, $R_1$, $R_3$ and $R_2$ being considered in this Figure.

Coil half $L_1$ can be regarded as the series arrangement of pure inductance $l_1$ and ohmic resistance $r_1$. The sawtooth current flowing through inductance $l_1$ produces thereacross a pulse-shaped voltage, whose average value is zero. The current produces across resistance $r_1$ a sawtooth voltage, which assumes the value zero at the centre instant $t_0$ of the trace period. Because said sawtooth decreases in this example during the trace period, the substantially constant value of the voltage across inductance $l_1$ is negative during this period.

FIG. 2 shows the sum of the pulse shape and the sawtooth, this being the voltage present across coil half $L_1$ and, consequently, also across resistor $R_1$ and the portion of potentiometer $R_3$ between the wiper thereof and resistor $R_1$. The current flowing through the resistors has approximately the same shape as this voltage since the current is almost exclusively determined by these resistors which are of a much higher value than resistance $r_1$. Because also coil half $L_2$ can be assumed to be the series arrangement of pure inductance and ohmic resistance, differential current $i_o$ comprises a direct current component which generates a static four-pole field which influence the convergence. From this it appears that the instant $t_1$ at which resistance branch $R_1$, $R_3$, $R_2$ does not introduce an error is located before instant $t_0$ and that an error does occur at instant $t_0$. The above also applies if the sawtooth across resistance $r_1$ increases during the trace period in which case the voltage across inductance $l_1$ is positive, so that the voltage across coil half $L_1$ becomes zero prior to instant $t_0$. In addition to said error in the static convergence an asymmetry is also caused in the operation of potentiometer $R_3$ between the top and the bottom of the displayed picture.

According to the invention the described error can be eliminated by providing a number of diodes, for example two diodes $D_1$ and $D_2$, between the terminal of resistor $R_1$ which is not connected to potentiometer $R_3$ and coil half $L_1$, while the same number of diodes $D_3$ and $D_4$ is provided between the terminal of resistor $R_2$, which is not connected to potentiometer $R_3$, and coil half $L_2$. All diodes $D_1$, $D_2$, $D_3$ and $D_4$ conduct in the direction which corresponds to the current direction through branch $R_1$, $R_2$, $R_3$ during the second half of the trace period. FIG. 3 shows this arrangement. A diode $D_5$ is arranged in parallel with diodes $D_1$ and $D_2$, and a diode $D_6$ is arranged in parallel with diodes $D_3$ and $D_4$, which diodes $D_5$ and $D_6$ conduct in the opposite direction to the other diodes.

At the beginning of the trace period deflection current $i_d$ flows in the direction shown while a current $I-i_d$ flows through elements $D_5$, $R_1$, $R_3$, $R_2$ and $D_6$. Currents of the same amplitude, both denoted by $i_o$ and having, for example, the direction shown flow through the mesh formed by elements $L_1$, $D_5$, $R_1$ and the upper portion of potentiometer $R_3$ and through the mesh formed by elements $L_2$, $D_6$, $R_2$ and the lower portion of potentiometer $R_3$. The current shown at the bottom in FIG. 3 flows through diode $D_6$ from the cathode to the anode, which cannot be objected to as the diode is kept in the conducting state by the greater current $I-i_d$. The voltage drop produced across diode $D_6$ is lower than the voltage which would be present across diodes $D_3$ and $D_4$, when conducting, so that the last-mentioned diodes remain cut-off.

In FIG. 4 the variation of current $i_o$ as a function of the time during the trace period T is represented by means of a solid line for the circuit of FIG. 1 and by means of a dashed line for the circuit of FIG. 3, in both cases for the same position of the wiper of potentiometer $R_3$. With respect to FIG. 1 the voltage drop across diodes $D_5$ and $D_6$ is subtracted in FIG. 3 from the voltage otherwise available across branch $R_1$, $R_3$, $R_2$, so that current $i_o$ is smaller. Because the voltage drop across the diodes is substantially constant, being twice the anode-cathode threshold voltage v of a conducting diode, the dashed line has been drawn substantially parallel to the solid line, as current $i_o$ is of the same shape as the prevailing voltage. At an instant $t_2$ prior to instant $t_1$ the voltage across diode $D_5$ and $D_6$, respectively, becomes lower than voltage v, so that the diodes are cut off. Currents $i_o$ and $I-i_d$ become zero.

At instant $t_0$ current I and, consequently, also current $i_d$ reverse their directions, whereafter a substantially linear increase occurs. At an instant $t_3$ the voltage of diodes $D_1$ and $D_2$, and $D_3$ and $D_4$, respectively, exceeds the value 2 v. These diodes begin to conduct, current $I-i_d$ flowing through them. Equal currents flow through the mesh formed by the elements $R_1$, $D_2$, $D_1$, $L_1$ and the upper portion of potentiometer $R_3$ and through the mesh formed by the elements $R_2$, $D_3$, $D_4$, $L_2$ and the lower portion of potentiometer $R_3$, the current shown at the bottom in FIG. 3 flowing through diode $D_3$ and $D_4$, which are kept in the conducting state by current $I-i_d$. Shortly after instant $t_3$ the dashed line in FIG. 4 is substantially parallel with the solid lines, separated by a space which corresponds to voltage 4v. With respect to FIG. 1, the voltage across diodes $D_1$, $D_2$, $D_3$ and $D_4$ is subtracted from the voltage otherwise available across branch $R_1$, $R_3$, $R_2$.

From the preceding paragraphs it appears that current $i_o$ is zero at instant $t_0$. So the error introduced by branch $R_1$, $R_3$, $R_2$ has been eliminated. Current $i_o$ is indeed zero during the entire interval $t_2$ to $t_3$, so that any asymmetry between the field generated by coil halves $L_1$ and $L_2$ cannot be corrected during this interval, but as current $i_o$ is then low this asymmetry can only be very small. It is also apparent that, prior to instant $t_2$ and after instant $t_3$, current $i_o$ always has a value which is lower than for the case of FIG. 1. Should current $i_o$ be as a consequence thereof too small for the asymmetry correction so that an accurate convergence at the top and at the bottom of the display screen appears to be impossible, then the suitable maximum value can be set for this current by a proper choice of the resistance value of branch $R_1$, $R_3$, $R_2$. For a display tube of the Philips type A66-540X and for coil halves $L_1$ and $L_2$, each having an inductance $l_1$ of approximately 5 mHz and an ohmic resistance $r_1$ of approximately 3.05Ω a value of approximately 180Ω appeared to be a suitable value for the resistance of branch $R_1$, $R_3$, $R_2$. The maximum value of current $i_d$ at the end of the trace period was approximately 1 A, while the value of the current $2i_o$ flowing through the wiper of potentiometer $R_3$ was approximately 0.04 A.

The above situation holds for a particular position of said wiper. With another position required for the correction of the asymmetry both the solid and the dashed line in FIG. 4 have a different slope. In a given range for this position current $i_o$ flows in a direction which is opposite to the direction considered above. In practice the value of the d.c. voltage, assumed to be 4 v in the example of FIG. 3, which is subtracted from the voltage across branch $R_1$, $R_3$, $R_2$ will be chosen so that it will be slightly higher than the voltage present across inductance $l_1$ during the traceperiod so that current $i_o$ will purely be zero at instant $t_o$, while interval $t_0$ to $t_3$ remains as short as possible. Interval $t_2$ to $t_0$ can be shortened by using, for example, germanium diodes as the diodes $D_5$ and $D_6$, these germanium type diodes having a lower, for example 0.2 V, anode-cathode threshold voltage v than the types such as, for example, silicon diodes for which v is approximately 0.7 V, which are used as the diodes $D_1$, $D_2$, $D_3$ and $D_4$.

A further improvement is obtained by replacing diodes $D_5$ and $D_6$ by the collector-emitter path of switching transistors. These transistors short-circuit the diodes $D_1$ and $D_2$, and $D_3$ and $D_4$, respectively, during the first half of the trace period whereas they are being kept in the cut-off state during the second half thereof. Suitable drive signals must then be applied to the bases of the transistors, which signals may be obtained from amplifier 1 or from the sawtooth generator preceding this amplifier. FIG. 5 shows a simple circuit. Herein diodes $D_1$ and $D_2$ are shunted by the collector-emitter path of a pnp-transistor $Tr_1$, the base resistor $R_{b1}$ of which is connected to the terminal of coil half $L_2$ drawn at the bottom and diodes $D_3$ and $D_4$ are shunted by the collector-emitter path of a non-transistor $Tr_2$, the base resistor $R_{b2}$ of which is connected to the terminal of coil half $L_1$ drawn at the top. The use of transistors ensures that the dashed line in FIG. 4 substantially coincides with the solid line so that interval $t_2$, $t_0$ is reduced to interval $t_1$, $t_0$.

A further practical improvement is to choose the voltages which are subtracted from the voltage across branch $R_1$, $R_3$, $R_2$ so that the interval $t_2$ to $t_0$ and $t_1$ to $t_0$, respectively, in which an asymmetry in the upper half of the displayed picture cannot be corrected, is approximately equal to the interval $t_0$ to $t_3$ in which an asymmetry in the lower half of the displayed picture cannot be corrected. This also ensures that the maximum values of current $i_o$ at the beginning and at the end of the trace period are equal to one another and that, consequently, the symmetry in the operation of potentiometer $R_3$ is recovered.

Figure 6:
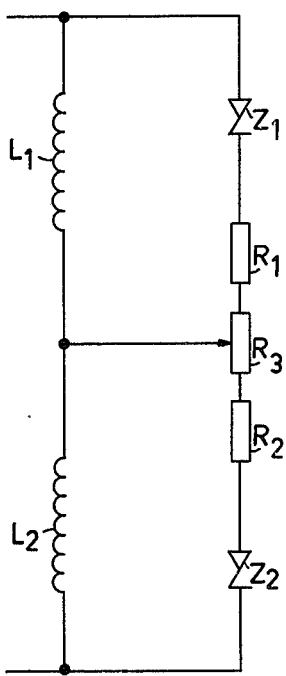

In the preceding description diodes $D_1$, $D_2$, $D_3$ and $D_4$ serve as elements across which a substantially constant voltage drop is present. It will consequently be obvious that each group of diodes can be replaced by one or more voltage-dependent resistors which are short-circuited prior to instant $t_2$ and $t_1$, respectively. Alternatively, one or more zener diodes can be used as constant voltage drop elements. FIG. 6 shows such a circuit in which two zener diodes $Z_1$ and $Z_2$ are used, short-circuiting elements not being required. Prior to an instant located before instant $t_0$ current flows through $Z_1$ and $Z_2$ in the pass direction and, consequently, the voltage drop thereacross is very low. After an instant located after instant $t_0$, on the contrary, current flows through diodes $Z_1$ and $Z_2$ into the reverse direction and the voltage drop thereacross is consequently higher. So current $i_o$ is subjected to a variation in accordance with the dashed line shown in FIG. 4. The drawback of a zener diode is that it is not possible to obtain any desired value for the voltage into the reverse direction, particularly for comparatively low voltages (below approximately 3 V).

It will be noted that, resistive branch $R_1$, $R_3$, $R_2$ being currentless around the center instant of the trace period, possible oscillations cannot then be damped. To enable this damping two resistors of equal values can be provided in the circuit in such a way that each resistor is in parallel with a deflection coil half. These resistors do not produce a differential current.

What is claimed is:

1. A color television display device comprising a color picture display tube and a deflection coil unit provided with a deflection coil for deflecting into the vertical direction the electron beams generated in the display tube, the coil being divided into two series-interconnected coil halves and being connected to a deflection current generator for generating a sawtooth deflection current flowing in operation through the deflection coil halves and having a trace and a retrace which reverses its direction at approximately the center instant of the trace period and further provided with an adjustable balancing resistor in a parallel branch which produces a correction circuit which flows through the deflection coil halves, wherein said device further comprises means for decreasing, during the trace period of the deflection current, the voltage present in operation across the parallel branch including said balancing resistor by a constant voltage in such a way that the voltage across said parallel branch is more decreased after said center instant than before and that the correction current at and about said center instant is substantially zero.

2. A device as claimed in claim 1, wherein said decreasing means comprises two series arrangements of a substantially constant-voltage drop element, each of which arrangements is shunted by a switch conducting before the center instant of the trace period of the deflection current with a balancing resistor, each series arrangement being in parallel with a coil half.

3. A device as claimed in claim 2, wherein the substantially constant-voltage drop element is formed by the series arrangement of a plurality of diodes in the pass direction after the center instant of the trace period.

4. A device as claimed in claim 2, wherein the substantially constant-voltage drop element comprises a voltage-dependent resistor.

5. An arrangement as claimed in in claim 1, wherein said decreasing means comprises two series arrangements of a zener diode with a balancing resistor, each series arrangement being in parallel with a coil half, the zener diodes being in the pass direction after the center instant of the trace period.

6. A device as claimed in claim 2, wherein the switch is formed by a switching diode.

7. A device as claimed in claim 6, wherein the anode-cathode threshold voltage of the switching diode is lower than the anode-cathode threshold voltage of a diode in the substantially constant-voltage drop element.

8. A device as claimed in claim 2, wherein the switch is formed by a switching transistor.

9. A device as claimed in claim 1, wherein the time interval prior to the center instant of the trace period of the deflection current, in which interval the correction current is zero, is approximately equal to the time interval after said center instant in which the correction current is zero.

10. A deflection coil unit for a color television display device, provided with a deflection coil for the horizontal deflection, with a deflection coil for the vertical deflection which is divided into two series-interconnected coil halves and with an adjustable balancing resistor in a parallel branch, wherein said deflection coil unit further comprises two series arrangements of a substantially constant-voltage drop element, a switch in parallel therewith, and a balancing resistor, each series arrangement being in parallel with a coil half.

* * * * *